United States Patent [19]
Dejaiffe

[11] Patent Number: 4,983,458
[45] Date of Patent: Jan. 8, 1991

[54] REFLECTIVE PARTICLES

[75] Inventor: Robert Dejaiffe, Oak Ridge, N.J.

[73] Assignee: Potters Industries, Inc., Parsippany, N.J.

[21] Appl. No.: 914,329

[22] Filed: Oct. 2, 1986

Related U.S. Application Data

[63] Continuation of Ser. No. 653,943, Sep. 21, 1984, abandoned.

[51] Int. Cl.$^5$ .................. G02B 5/128; E01C 23/16; F21V 7/22; C08J 9/32
[52] U.S. Cl. ........................... 428/402; 350/105; 404/94; 428/406; 428/407; 523/172; 523/219
[58] Field of Search .......... 350/105; 404/17, 22, 404/71, 93, 94; 428/325, 357, 402, 406, 407; 523/172, 219

[56] References Cited

U.S. PATENT DOCUMENTS 3,418,896  12/1968  Rideout .......................... 523/219

FOREIGN PATENT DOCUMENTS 3162   5/1962   Japan.
22086  10/1963  Japan.
22614  10/1963  Japan.
31735  3/1976   Japan.

Primary Examiner—William J. Van Balen
Attorney, Agent, or Firm—Curtis, Morris & Safford

[57] ABSTRACT

A reflective marker for highway striping, signs and other surfaces is produced from a multiplicity of thermoplastic or thermosetting granules in the shape of tetrahedrons. A plurality of glass spheres having a diameter in the range of from about 6.0 microns to about 0.125 inches are substantially evenly dispersed throughout each granule with some of the spheres protruding through the outer granule surfaces. To form the granules the glass spheres, the granule material and a suitable pigment are mixed together and then applied to a flexible sheet or a roller containing a multiplicity of tetrahedron-shaped indentations. The mixture is urged into each of the indentations and is then cured. The resulting granules are removed from the indentations and are dropped from a random position onto a freshly painted highway line or other surface such that one of the flat faces on each granule is disposed in a downward direction. As the paint dries and hardens, the granules are firmly held in place on the surface to provide a reflective marker.

1 Claim, 2 Drawing Sheets

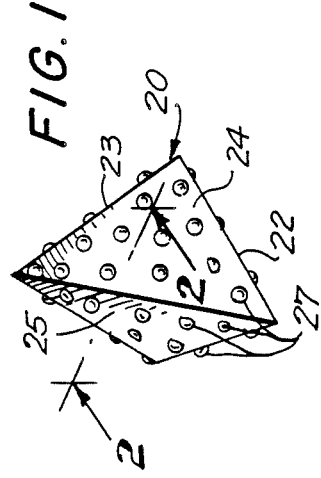
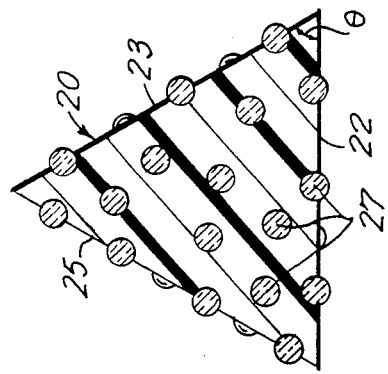
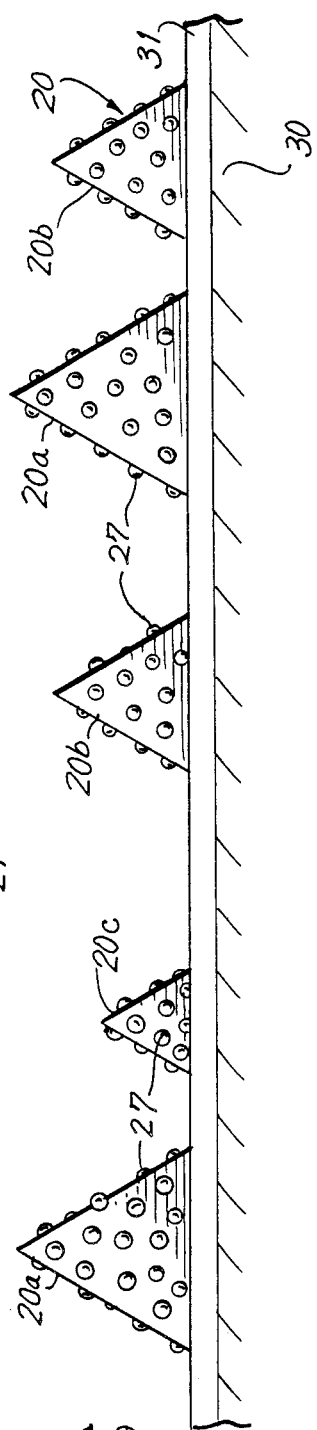
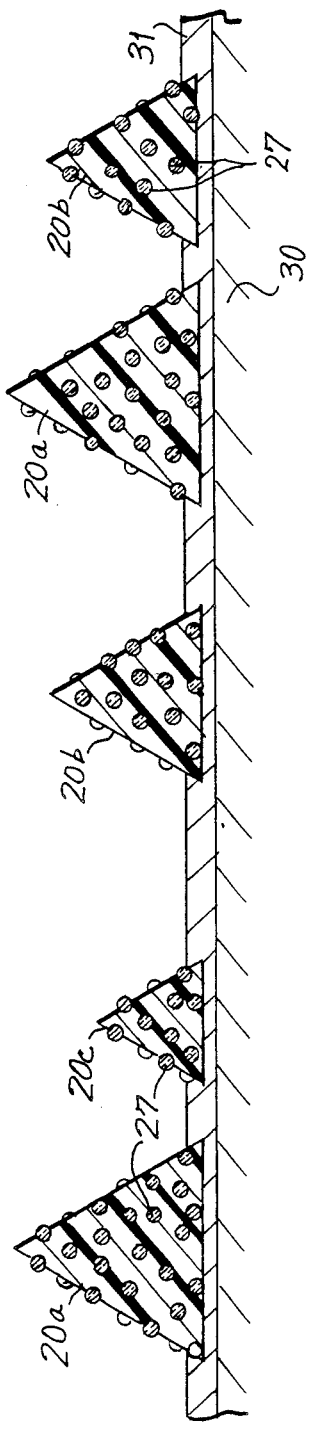
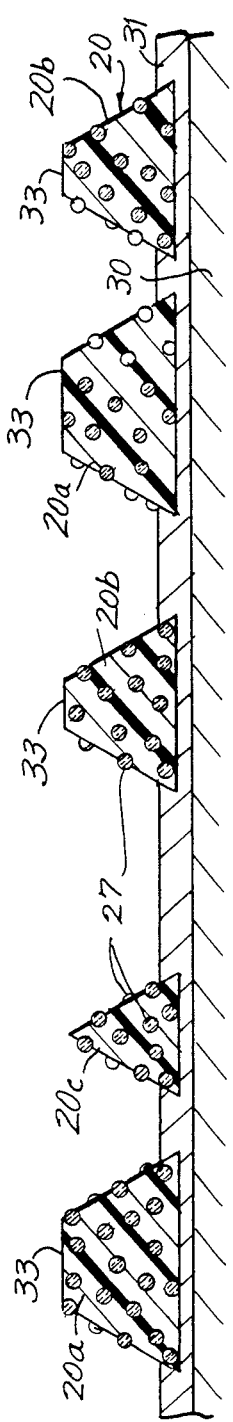

REFLECTIVE PARTICLES

This application is a continuation of application Ser. No. 653,943, filed Sept. 21, 1984.

BACKGROUND OF THE INVENTION

This invention relates to reflective material and more particularly to reflective particles used for reflective marking.

The present invention, while of general application, is particularly well suited for use on highways to provide reflective markers such as edge and lane striping, signs, etc. As is well known, it has become common practice to drop small glass spheres onto a painted line on a highway while the paint is still tacky such that the spheres are partially imbedded in the paint when it has dried. The spheres render the line or other marker retroreflective and reflect the light from headlights so that the marker is more visible to the motorist. In some cases the spheres were imbedded in spherical or irregularly shaped plastic granules prior to being applied to the paint in the manner disclosed in U.S. Pat. Nos. 3,252,376 and 3,254,563, for example, in an effort to further improve the reflectivity of the marker.

Heretofore, difficulties were encountered in the manufacture and use of reflective material of the foregoing type. As an illustration, in many instances the adhesion of the glass spheres to the paint proved deficient, with the result that some of the spheres were loosened by traffic or washed away druing rainstorms, for example, with a corresponding deterioration in the reflectivity of the surface. In addition, the spheres that remained were subjected to severe abrasion under heavy traffic conditions and exhibited flattened upper surfaces which further impaired the reflectivity of the marker. Furthermore, and this has been of special moment during periods of heavy rain, the reflectivity of even freshly applied striping or other marking was deficient in a number of respects.

SUMMARY

One general object of the invention, therefore, is to provide a new and improved reflective particle for use in highway and other reflective marking.

More specifically, it is an object of this invention to provide a reflective particle that remains in place on a supporting surface for an extended period of time.

A further object of the invention is to provide a reflective marker which exhibits uniform and in some cases improved reflectivity after long periods of use.

Still another object of the invention is to provide a reflective marker which exhibits good reflectivity when in a wet or moistened condition.

A still further object of the invention is to provide an improved reflective marker which is economical and thoroughly reliable in operation.

In one illustrative embodiment of the invention, the reflective marker comprises a multiplicity of uniquely shaped granules of plastic material. Imbedded in at least the exposed surfaces of the granules are a plurality of glass spheres which protrude through the surfaces to provide the granules with reflective characteristics. For many applications the granules are dropped or otherwise applied to a painted substrate with the paint in a tacky condition, but in other cases the granules may be premixed with paint and then applied to the substrate in a single operation.

In accordance with one feature of the invention, each of the granules is provided with at least one flat face and is of a shape such that when dropped from a random position onto a horizontal surface the flat face is disposed in a downward direction. The flat face is imbedded in the layer of paint to provide optimum adhesion of the granule to the surface.

In accordance with another feature of the invention, in certain particularly important embodiments, each granule is in the shape of a tetrahedron. The tetrahedrons preferably are of a shape such that when sprinkled from a random position onto a painted line of a highway, for example, one of the faces of the tetrahedron is disposed downwardly and the remaining faces meet the downward face at an angle of about seventy degrees. With this arrangement the resulting marker exhibits high reflectivity with respect to the headlights of a vehicle particularly under wet conditions.

In accordance with a further feature of several advantageous embodiments of the invention, the maximum height of the plastic granules above the surface lies within the range of from about 2 millimeters to about 12 millimeters, and the granules are of at least two distinct sizes. The larger size granules become flattened by traffic to expose a greater quantity of the glass spheres imbedded therein, while the smaller granules retain their tetrahedron shape for an extended period of time. The arrangement is such that the reflectivity of the marker remains substantially uniform and in some cases increases during long periods of use.

In accordance with still another feature of the invention, in several good arrangements, the granules are formed by advancing a plastic sheet in a softened condition over a roller containing a multiplicity of tetrahedron-shaped indentations to individually mold each granule. The glass spheres are applied to the sheet prior to the molding operation by spraying the spheres onto the flat surfaces of the sheet and in some cases by mixing additional spheres with the plastic material used to form the sheet. The size and shape of each individual granule is determined by the configuration of the indentations in the roller to provide a very precise control over the reflectivity characteristics of the resulting marker.

The present invention, as well as further objects and features thereof, will be more fully understood from the following description of certain preferred embodiments, when read with reference to the accompanying drawings.

BRIEF DESCRIPTION OF THE DRAWINGS

FIG. 1 is a substantially enlarged perspective view of a molded tetrahedron-shaped granule containing glass spheres in accordance with an illustrative embodiment of the invention.

FIG. 2 is a vertical sectional view taken along the line 2—2 in FIG. 1.

FIG. 3 is an enlarged side elevational view of a portion of a roadway having a reflective marker which includes different size granules of the type illustrated in FIG. 1.

FIG. 4 is a vertical sectional view of the roadway portion of FIG. 3.

FIG. 5 is a vertical sectional view similar to FIG. 4 but showing the reflective marker after it has been subjected to heavy traffic.

DESCRIPTION OF CERTAIN PREFERRED EMBODIMENTS

Figure 7:
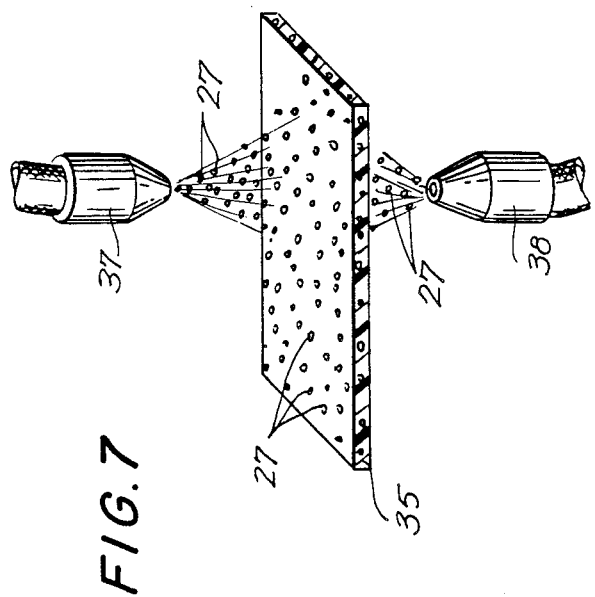
FIG. 7 is a prespective view of the thermoplastic sheet of FIG. 6 during the application of glass spheres to its exposed surfaces.

Referring to FIGS. 1 and 2 of the drawings, there is shown a small reflective particle in the form of a plastic resin granule 20. The granule 20 has at least one flat face 22 and is of a shape such that when dropped from a random position onto a horizontal surface the face 22 is disposed in a downward direction, for purposes that will become more fully apparent hereinafter. Advantageously the granule 20 is in the form of a tetrahedron and in addition to the downward face 22 has additional faces 23, 24 and 25. For granules in the shape of an equilateral tetrahedron the angle $\theta$ between the face 22 and the adjoining faces 23, 24 and 25 is 60°. Particularly good results are achieved with granules having an angle $\theta$ of at least 60° and preferably about 70°.

Evenly dispersed throughout the granule 20 are a multiplicity of glass beads or spheres 27. Some of the spheres 27 protrude through the faces 22, 23, 24 and 25 of the granule 20 and similarly are evenly dispersed through the surface area of each face. The spheres 27 are of a type commonly used in reflective marking and have a diameter in the range of from about 6.0 microns to about 0.125 inches depending upon the particular type of reflective marker with which the spheres are to be used. For best results the spheres 27 should have an index of refraction of at least about 1.5, and in situations where particularly good retroreflectivity is desired the refractive index of the spheres may be up to about 2.0. In some cases a reflective coating such as a silver may be applied to the spheres which provides even higher retroreflectivity for certain applications. The spheres illustratively may be produced in the manner disclosed in T. K. Wood U.S. Pat. No. 2,947,115, for example, and for many applications they are provided with a suitable coupling agent coating such as the silanes, titanates with vinyl groups, terminal amines or epoxides. For a more detailed discussion of representative coatings for the spheres, reference may be had to James R. Ritter et al U.S. Pat. No. 3,867,178 .

The tetrahedron-shaped granules 20 containing the glass spheres 27 may be employed as illustrated in FIG. 3 to provide a reflective marker on a surface 30 which illustratively comprises a roadway or highway sign. A layer 31 of traffic paint of other adherent material is first applied to the surface 30, and while the paint is still tacky the granules 20 are dropped from a random position and become imbedded in the paint. Because of their configuration the granules 20 come to rest on the painted surface with one of their flat faces 22 disposed in a downward direction irrespective of the orientation of the granules at the time of their release. With this arrangement the entire area of the face 22 on each granule is in facing contact with the paint to provide extremely good adhesion between the granules and the roadway surface. Each individual granule is imbedded in the layer of paint, and the paint may exhibit a slight wicking action to further help maintain the granules in position and prevent any substantial quantity of granules from becoming dislodged even under heavy traffic conditions.

The size of the plastic granules 20 is carefully controlled such that their height above the roadway surface 30 ranges between about 2 millimeters and about 12 millimeters. For granules having a height much below 2 millimeters the quantity of glass spheres 27 within each granule is too small to provide a satisfactory improvement in retroreflective properties, particularly during rainy conditions, while for granules above about 12 millimeters in height the surface becomes too rough and there is unnecessary wastage of the granule material due to traffic wear, shearing by snow plows, etc. In addition, the granules within this range advantageously are divided into two and in some cases three distinct sizes. As illustrated in FIGS. 3 and 4, for example, the granules applied to the surface 20 comprises comparatively large granules 20a which range in height from about 6 millimeters to about 12 millimeters, medium-size granules 20b which range in height from about 4 millimeters to about 6 millimeters, and small granules 20c which range in height from about 2 millimeters to about 4 millimeters. In cases in which only two size ranges are used for the granules, the large granules have a height of between about 5 millimeters and about 12 millimeters, and the small granules have a height between about 2 millimeters and about 5 millimeters.

FIG. 5 is an illustration of the granule-coated roadway surface 30 after being subjected to abrasion by heavy traffic. The upper portions of the large granules 20a and the medium-size granules 20b have been eroded to provided flat horizontal surfaces 33, while the upper portions of the small granules 20c have not been subjected to abrasion and retain their original tetrahedron shapes. During the erosion of the granules 20a and 20b the glass spheres 27 within the interiors of the granules become exposed and protrude through the upper surfaces 33 to help retain the optical properties of these larger granules. In addition, the reflective angle $\theta$ (FIG. 2) remains the same irrespective of the degree of erosion and preferably is approximately 70° to provide an optimum reflective angle on a highway for the headlights of a vehicle. The arrangement is such that the reflective marker retains good retroreflective properties even after being exposed to long periods of heavy traffic, and there is very little impairment of the retroreflective properties during rainstorms and in other instances where puddles are formed on the roadway. The flat surfaces 33 on the larger granules 20a and 20b in many instances are disposed above the puddles, and the glass spheres protruding therefrom retain much of their retroreflective properties.

The material from which the granules 20 are formed may be selected from a wide variety of thermoplastic and thermosetting resins. Suitable thermoplastic resins include the polyolefins, polyethylene, polypropylene, polymethyl methacrylate, acrylonitrile butadiene styrene, etc., while the thermosetting resins that may be used comprise the polyesters, urethanes, methyl methacrylate and acrylonitrile. Substantially any thermoplastic or thermosetting resin may be employed that exhibits good wear resistance and gives off a minimum of volatile matter during curing.

The polyester resins, for example, in general comprise unsaturated alkyd resins which are formed by the reaction of one or more dicarboxylic acid components and one or more polyhydric alcohols. Illustrative dicarboxylic acid components include saturated anhydrides and adipic and azelaic acids, and the unsaturated components fumaric acid and maleic acid. The commonly used dihydric alcohols include glycols of ethylene propylene, 1, 3- and 2, 3- butylene, diethylene and dipropylene. The polyester reaction products are mixed with a nonvolatile unsaturated monomeric cross-linking agent for the polyester resin such as a methyl methacrylate. Other materials that may be employed as a monomeric agent include styrene, vinyl toluene, vinyl acetate, ortho and para methyl styrene, divinyl benzene, ethyl acrylate and many others. The monomeric agent is of the nature such that it is consumed during the curing of the resin without forming volatile materials.

Still other illustrative materials that may be employed to form the granules 20 include the epoxy resins containing both epoxide and hydroxyl groups and the urethane resins resulting from reactions between hydroxyl groups and polyisocyanates. For a more detailed discussion of representative thermoplastic and thermosetting resins which are useful as the granule material, reference may be had, for example, to De Vries et al U.S. Pat. Nos. 3,171,827 and 3,254,563.

The resin material for the granules 20 is obtained commercially in liquid, powder or pelletized form. The material is thoroughly mixed with glass spheres having a diameter in the range of from about 6.0 microns to about 0.125 inches and an index of refraction of from about 1.5 to about 2.0 and even higher depending upon the particular application. For highway striping, for example, the glass spheres may be produced from conventional soda lime silicate glass having an index of refraction of about 1.5. For roadways in areas subjected to heavy precipitation, or for signs, motion picture screens and other applications where even better reflectivity is desired, the spheres may be fabricated from some of the titanium glasses having a higher index of refraction, or they may comprise spheres having varying indices or spheres coated with a reflective material such as silver or aluminum. As an illustration, good results may be achieved where the spheres located in the interior of the granules have an index of refraction of, say, 1.5, and the exposed spheres on the surfaces of the granules have an index of refraction of about 1.9.

A suitable pigment is added to the mixture of resin material and glass spheres to impart reflection to the resin as well as color and opacity. For edge striping on a highway, for example, a white pigment is employed such as rutile titanium dioxide or anatase titanium dioxide, for example. Other pigments that may be used to produce white, yellow or other colored mixtures include aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc. The pigments can be extended with suitable natural or manufactured granule materials.

The thermosetting resins commonly are available in liquid form. Upon being mixed with the glass spheres 27 and the pigment, the liquid is spread onto the upper surface of a flexible rubber sheet or belt which contains a multiplicity of tetrahedron-shaped indentations. A suitable doctor blade may be employed to urge the material into each indentation. The material is then cured at an elevated or room temperature, and the sheet is flexed to discharge the individual tetrahedron granules into appropriate collecting equipment. Additional spheres may be applied to the surfaces of the tetrahedrons as they are formed, and one preferred embodiment used spheres having a refractive index of about 1.5 in the interiors of the tetrahedrons to provide rigidity and good wear resistance, and surface spheres having a refractive index of about 1.9 for high retroreflectivity.

The thermoplastic resins, on the other hand, for the most part are available commercially in powder or pelletized form. After being mixed with the glass spheres 27 and the pigment, the particulate material is extruded under heat to form a softened flat sheet which is shown by the reference character 35 in FIGS. 6–9. The sheet 35 includes a multiplicity of the glass spheres 27 substantially evenly dispersed therein. At this stage in the manufacturing process substantially all of the spheres are imbedded within the resin material, and the glass is not exposed to any great extent on the flat opposed surfaces of the sheet.

As best shown in FIG. 7, the thermoplastic sheet 35 is then advanced between two spray nozzles 37 and 38. The nozzles 37 and 38 direct additional glass spheres 27 onto the opposed flat surfaces of the sheet 35 to partially imbed the additional spheres in the still tacky material.

Figure 9:
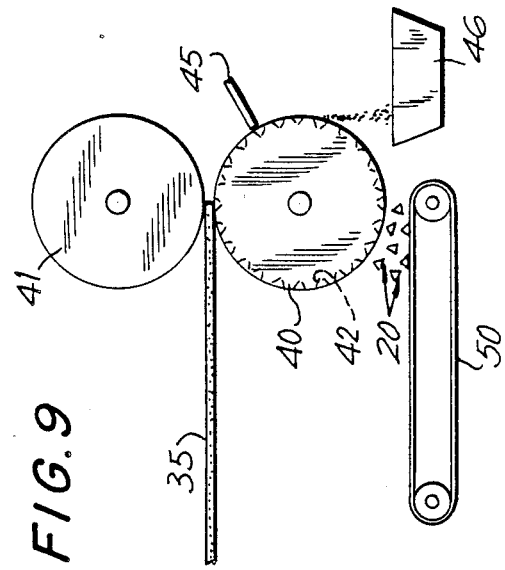
FIG. 9 is a partially schematic side elevational view of the rollers and associated components illustrated in FIG. 8.
Figure 6:
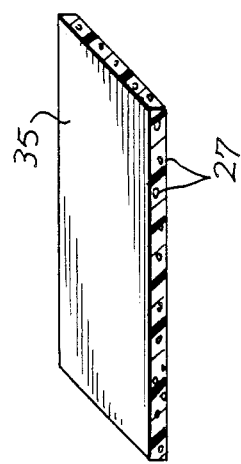
FIG. 6 is a perspective view with a portion shown in section of a thermoplastic sheet used in the manufacture of the granules.
Figure 8:
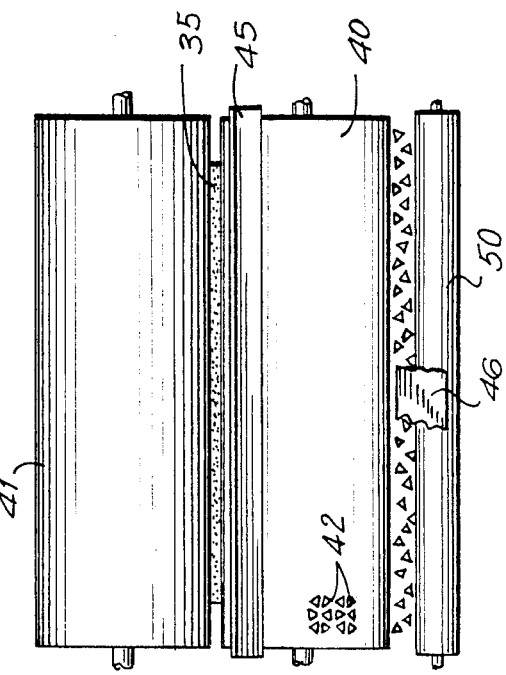
FIG. 8 is a partially schematic front elevational view of the thermoplastic sheet as it is advanced between rollers to form the granules.

The sheet 35 containing the glass spheres 27 dispersed therein and on its opposed flat surfaces is advanced through the nip between two rollers 40 and 41 (FIGS. 8 and 9). The rollers 40 and 41 are rotated at a constant speed by a suitable drive mechanism (not shown). The lowermost of these rollers 40 contains a multiplicity of tetrahedron-shaped indentations 42 throughout its cylindrical surface, and the indentations correspond in size and configuration to the plastic granules 20a, 20b and 20c illustrated in FIGS. 3–5. Thus, some of the indentations are of a size equal to or only slightly greater than the large granules 20a, other indentations are of a size equal to or only slightly greater than the medium granules 20b, and still other indentations are of a size equal to or only slightly greater than the small granules 20c. The indentations serve as molds for the individual granules, and as the sheet 35 passes between the rollers 40 and 41 the sheet material is urged under pressure into each indentation to thereby form the granules. The glass spheres 27 are substantially evenly dispersed throughout each granule with some of the spheres protruding through the outer granule surfaces.

As the thus molded granules 20 leave the nip between the rollers 40 and 41, the roller 40 is cleaned by scraping excess resin material from its cylindrical surface through the use of a doctor blade 45. The excess material is discharged into a trough 46 so that is may be recycled to form additional granules.

Upon continued rotation of the roller 40, the granules 20 within the indentations 42 drop onto a suitable conveyor 50. The conveyor 50 collects the granules 20 and transports them to a suitable bagging machine or other packaging equipment.

The proportion of the glass spheres 27 within and on the surfaces of each of the granules 20 should be carefully controlled to provide optimum reflective properties. For best results the finished granule incorporates about 30 percent to about 60 percent by weight of the spheres. If the weight of the spheres exceeds about 60 percent of the granule material the structural integrity of the granules is too poor to provide a satisfactory product, while with a sphere weight below about 30 percent of the granule material the reflectivity is so low that the granules are unsuitable for use as a reflective marker. In cases in which the weight of the spheres within each granule and on its exposed surfaces is about fifty percent the weight of the granule, the granule exhibits particularly good characteristics when employed for lane marking and other highway striping.

The thus prepared granules 20 are applied to a roadway or other surface through the use of conventional delineation equipment. The granules are dropped from a random position onto the surface, and each granule comes to rest with one of its flat faces disposed in a downward direction such that it is imbedded in the paint. The different size granules 20a, 20b and 20c are evenly distributed on the surface, and when the paint or other film forming material is fully cured the particles are firmly held in position to provide an extremely effective reflective marker.

In some embodiments of the invention the reflective granules 20 may be pre-mixed with liquid paint prior to being applied to the surface. For highway striping, for example, the mixture of paint and granules is applied directly to the roadway, and a large percentage of the granules become oriented with the faces 22 disposed in a downward direction while the viscosity of the paint is still relatively low. As the pain dries and hardens, the granules are maintained in place, and upon being exposed to traffic the thin layer of paint adjacent the upper portions of the granules is worn off to provide good reflectivity.

In order to more thoroughly disclose the nature of the present invention, the following examples illustrating the invention are given. It should be understood, however, that this is done solely by way of example and is intended neither to delineate the scope of the invention nor limit the ambit of the appended claims.

EXAMPLE 1

Methyl methacrylate resin in liquid form is mixed with a conventional white highway pigment and with glass spheres manufactured in accordance with the teachings of T. K. Wood U.S. Pat. No. 2,945,326. The spheres are of soda lime silicate glass with an index refraction of 1.5, and they range in diameter from 200 microns to 350 microns. The spheres are substantially evenly dispersed throughout the resin in a proportion of about 1 part by weight of spheres to about 2 parts by weight of the resin material.

Through the use of a doctor blade, the thus prepared mixture is spread over a flat rubber sheet which contains a multiplicity of tetrahedron-shaped indentations in its upper surface. The mixture is urged into each of the indentations and is cured through the application of heat to form a multiplicity of tetrahedron-shaped granules containing glass spheres substantially evenly dispersed throughout each granule with some of the spheres protruding through the outer faces thereof. The indentations in the sheet are of a size such that approximately one-half of the granules have a height of 6 millimeters and one-half have a height of 4.5 millimeters. The granules are removed from the indentations and placed in bags.

The bags of reflective particles produced in this example are transported to a roadway, and the particles are dropped from a random position onto a line of moist white traffic paint having a thickness of approximately 0.75 millimeters. Each of the particles drops onto the paint with one of the faces of the particle disposed in a downward direction such that is is imbedded in the paint. As the paint dries, the particles are firmly held in position on the roadway to provide an extremely effective reflective marker. After repeated exposure of the roadway to heavy traffic, the upper portions of some of the larger reflective particles are flattened by abrasion, but substantially all of the particles remain imbedded in the paint, and there is only a very slight decrease in reflectivity even after extended periods of use.

EXAMPLE 2

Acrylonitrile butadiene styrene resin in powder form is mixed with glass spheres produced in accordance with the teachings of T. K. Wood et al U.S. Pat. No. 3,279,905. A titanium glass is used for the spheres to provide an index of refraction of 1.9, and the diameter of the spheres ranges between about 350 microns and about 630 microns. The resin-sphere mixture is extruded at an elevated temperature to form a thin tacky sheet, and additional glass spheres are sprayed onto both of the flat surfaces of the sheet to partially imbed the additional spheres therein.

The sheet in a softened condition is then advanced through the nip between a pair of continuously rotating rollers of the type illustrated in FIGS. 8 and 9 of the drawings. One of the rollers is provided with a multiplicity of indentations in its cylindrical surface which are each in the shape of an equilateral tetrahedron. As the sheet moves between the rollers the sheet material is urged into these indentations to form a multiplicity of tetrahedron-shaped thermoplastic granules containing glass spheres substantially evenly dispersed throughout each granule with some of the spheres protruding through the outer surfaces thereof. The indentations in the roller are of two different sizes such that approximately 50 percent of the tetrahedron-shaped granules have a height of 4 millimeters and the remaining 50 percent have a height of 6 millimeters. The weight of spheres within each granule is equal to that of the granule material.

The granules are removed from the indentations in the roller and are transported to a highway, where they are dropped from random positions onto a yellow line of still tacky traffic paint along the center of the highway. Each granule comes to rest with one of its flat faces disposed in a downward direction and imbedded in the paint. After the paint has dried the granules remain in position during periods of heavy rain and after long use.

EXAMPLE 3

Polypropylene resin in pelletized form is extruded at a temperature of 180° C. to form a thin flat sheet. Glass spheres having a size of between 50 and 100 mesh U.S. Standard are sprayed onto the opposite faces of the sheet while the sheet is maintained in a softened condition at about 120° C. to about 140° C. The spheres are of barium titinate glass with an index of refraction of 1.9 and are partially imbedded in the faces of the sheet. The sheet is then advanced in a softened condition over a roller which contains a multiplicity of tetrahedron-shaped indentations in its cylindrical surface to urge material from the sheet into the indentations and thereby form a multiplicity of tetrahedron-shaped granules containing glass-spheres. The indentations are of equal size to similarly produce equal-size granules having a height of 4.5 millimeters. The proportion of spheres to the polypropylene resin is about 3 parts by weight of spheres to about 5 parts of resin.

The tetrahedron-shaped granules are transported to a highway and dropped onto a line of tacky traffic paint in the manner described above. Upon the hardening of the paint the granules remain in position and exhibit good reflectivity characteristics.

EXAMPLE 4

In each of the foregoing examples a pigment of the same color as that used for the highway line is admixed with the resin material prior to the time the material is extruded. The resulting granules have a corresponding color and provide a further improvement in the reflectivity of the line.

EXAMPLE 5

A thin coating of silver is applied to the glass spheres in the manner more fully described in copending U.S. patent application Ser. No. 346,648 filed Feb. 8, 1982. The thus coated spheres are used to produce plastic granules in the manner set forth in Examples 1–4, and the granules are dropped from a random position onto the horizontally disposed painted surface of a highway sign while the paint is in a tacky condition. The granules remain in place on the sign for an extended period of time and provide an even further improvement in the overall reflectivity.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A multiplicity of small reflective particles comprising tetrahedron-shaped granules of plastic material, and a plurality of glass spheres substantially evenly dispersed throughout each granule with some of the spheres protruding through the outer surface thereof, the proportion of said spheres to the granule material being about 30 to 60 percent by weight for each granule, each of the granules having a plurality of flat faces which meet at an acute angle to form a straight abrupt edge, the granules being of a size and shape such that when dropped from a random position onto a horizontal tacky surface a flat face of all of the granules sinks into said surface in facing contact therewith, the abrupt edges of all of the granules forming wedges to hold the granules in place on said surface.

* * * * *